US009477965B2

United States Patent
Popkiewicz et al.

(10) Patent No.: US 9,477,965 B2
(45) Date of Patent: *Oct. 25, 2016

(54) APPARATUS AND METHOD FOR IDENTIFYING INSERTION ZONES IN VIDEO MATERIAL AND FOR INSERTING ADDITIONAL MATERIAL INTO THE INSERTION ZONES

(71) Applicant: MirriAd Limited, London (GB)

(72) Inventors: Mark Popkiewicz, Cranbourne (GB); Janko Mrsic-Flogel, London (GB); Philip McLauchlan, Epsom (GB)

(73) Assignee: MirriAd Advertising Limited, London (GB)

( * ) Notice: Subject to any disclaimer, the term of this patent is extended or adjusted under 35 U.S.C. 154(b) by 164 days.

This patent is subject to a terminal disclaimer.

(21) Appl. No.: 14/553,893

(22) Filed: Nov. 25, 2014

(65) Prior Publication Data

US 2015/0078733 A1    Mar. 19, 2015

Related U.S. Application Data

(63) Continuation of application No. 12/954,766, filed on Nov. 26, 2010, now Pat. No. 8,929,720, which is a continuation of application No. PCT/GB2009/001339, filed on May 28, 2009.

(30) Foreign Application Priority Data

May 28, 2008  (GB) .................................. 0809631.5

(51) Int. Cl.
*G11B 27/034* (2006.01)
*G11B 27/036* (2006.01)
(Continued)

(52) U.S. Cl.
CPC .......... *G06Q 30/0241* (2013.01); *G06Q 30/02* (2013.01); *G11B 27/034* (2013.01); *G11B 27/036* (2013.01); *G11B 27/28* (2013.01); *H04N 9/8205* (2013.01)

(58) Field of Classification Search
CPC ............ G06Q 30/02; G06Q 30/0241; G11B 27/034; G11B 27/036; G11B 27/28; H04N 9/8205
USPC ............... 386/278, 248–250; 725/32–36, 42; 348/584; 382/209, 282; 705/14.73, 113
See application file for complete search history.

(56) References Cited

U.S. PATENT DOCUMENTS 5,491,517 A * 2/1996 Kreitman ............. H04N 5/2628 348/581
5,953,076 A    9/1999 Astle et al.
(Continued)

OTHER PUBLICATIONS

International Search Report (ISR) from parent application PCT/GB2009/001339, mailed Jul. 31, 2009.
(Continued)

*Primary Examiner* — Thai Tran
*Assistant Examiner* — Stephen Smith
(74) *Attorney, Agent, or Firm* — Maschoff Brennan

(57) ABSTRACT

An apparatus and method for automatic detection of insertion zones within pre-recorded video material are provided. The apparatus includes a video analysis unit configured to automatically determine at least one candidate insertion zone within the pre-recorded video material suitable for receiving additional material to be inserted and configured to generate zone meta data defining attributes of the insertion zone, and an insertion module configured to receive additional material for insertion and arranged to generate an output representative of the pre-recorded video material with the additional material placed on an insertion zone such that the additional material adopts the image attributes of the insertion zone as the pre-recorded video material is played. The automatic determination of at least one insertion zone is based on one or more of feature shape, size, duration, movement, color.

20 Claims, 19 Drawing Sheets

(51) Int. Cl.
  *G06Q 30/02* (2012.01)
  *G11B 27/28* (2006.01)
  *H04N 9/82* (2006.01)

(56) References Cited

U.S. PATENT DOCUMENTS

| | | | | |
|---|---|---|---|---|
| 7,230,653 | B1* | 6/2007 | Overton | G06T 19/00 348/584 |
| 7,689,062 | B2* | 3/2010 | Baharav | H04N 5/2723 345/629 |
| 8,079,054 | B1* | 12/2011 | Dhawan | G06Q 30/00 705/14.4 |
| 8,281,334 | B2* | 10/2012 | Shan | G06Q 30/02 715/246 |
| 8,595,760 | B1* | 11/2013 | Singh | H04N 21/4331 705/14.69 |
| 8,929,720 | B2* | 1/2015 | Popkiewicz | G06Q 30/02 386/249 |
| 2002/0112249 | A1* | 8/2002 | Hendricks | H04H 20/10 725/136 |
| 2002/0131511 | A1* | 9/2002 | Zenoni | G07C 9/00158 375/240.28 |
| 2002/0157112 | A1* | 10/2002 | Kuhn | H04N 21/23433 725/113 |
| 2002/0162110 | A1* | 10/2002 | Wakimoto | H04N 7/173 725/87 |
| 2003/0028432 | A1* | 2/2003 | Troyansky | G06Q 30/02 705/14.66 |
| 2003/0081813 | A1* | 5/2003 | Astle | G01S 3/7864 382/103 |
| 2004/0116183 | A1* | 6/2004 | Prindle | A63F 13/12 463/42 |
| 2005/0137958 | A1* | 6/2005 | Huber | G06Q 30/02 705/37 |
| 2006/0026628 | A1* | 2/2006 | Wan | H04N 5/272 725/32 |
| 2006/0187358 | A1* | 8/2006 | Lienhart | G06F 17/30802 348/661 |
| 2007/0005795 | A1* | 1/2007 | Gonzalez | G06F 17/30017 709/232 |
| 2007/0083887 | A1* | 4/2007 | Gutta | G06Q 30/02 725/35 |
| 2007/0154190 | A1* | 7/2007 | Gilley | G06F 17/30796 386/241 |
| 2007/0206923 | A1* | 9/2007 | Murakoshi | G11B 27/28 386/230 |
| 2007/0226761 | A1* | 9/2007 | Zalewski | G06Q 30/02 725/32 |
| 2007/0250901 | A1* | 10/2007 | McIntire | H04N 7/17318 725/146 |
| 2008/0043848 | A1* | 2/2008 | Kuhn | G06F 17/30811 375/240.16 |
| 2008/0046920 | A1* | 2/2008 | Bill | G06Q 30/02 725/34 |
| 2008/0092168 | A1* | 4/2008 | Logan | G06F 17/30265 725/44 |
| 2008/0231751 | A1* | 9/2008 | Zalewski | H04N 5/147 348/578 |
| 2008/0276266 | A1* | 11/2008 | Huchital | G06Q 30/02 725/32 |
| 2008/0304805 | A1* | 12/2008 | Baharav | G11B 27/034 386/248 |
| 2009/0006375 | A1* | 1/2009 | Lax | H04N 21/435 |
| 2009/0052783 | A1* | 2/2009 | Aoki | G06F 17/30793 382/209 |
| 2009/0070206 | A1* | 3/2009 | Sengamedu | G06F 17/30014 705/14.73 |
| 2009/0076882 | A1* | 3/2009 | Mei | G06Q 30/0242 705/14.41 |
| 2009/0079871 | A1* | 3/2009 | Hua | G11B 27/036 348/584 |
| 2009/0092374 | A1* | 4/2009 | Kulas | H04N 7/173 386/248 |
| 2009/0094637 | A1* | 4/2009 | Lemmons | H04N 7/17318 725/32 |
| 2009/0116754 | A1* | 5/2009 | Samboursky | G06T 15/50 382/219 |
| 2009/0150210 | A1* | 6/2009 | Athsani | G06Q 30/00 705/7.29 |
| 2009/0150930 | A1* | 6/2009 | Sherwin | G11B 27/031 725/35 |
| 2009/0158322 | A1* | 6/2009 | Cope | H04N 9/8205 725/36 |
| 2009/0171787 | A1* | 7/2009 | Mei | G06Q 30/02 705/14.69 |
| 2009/0222854 | A1* | 9/2009 | Cansler | H04N 7/17318 725/35 |
| 2010/0122286 | A1* | 5/2010 | Begeja | G06Q 30/02 725/34 |
| 2011/0016487 | A1* | 1/2011 | Chalozin | G06T 19/006 725/35 |
| 2011/0075992 | A1* | 3/2011 | Mei | G06Q 30/02 386/249 |
| 2011/0238495 | A1* | 9/2011 | Kang | G06Q 30/02 705/14.49 |
| 2011/0321087 | A1* | 12/2011 | Huber | G06Q 30/02 725/34 |
| 2013/0019261 | A1* | 1/2013 | Huber | G06Q 30/0269 725/32 |

OTHER PUBLICATIONS

Wan et al. "Advertising Insertion in Sports Webcasts" MultiMedia, IEEE, Apr.-Jun. 2007 vol. 14, Issue: 2, pp. 78-82.
International Search Report, May 28, 2008 in PCT Application No. PCT/GB2009/001339.
Written Report mailed Apr. 2005 in PCT Application No. PCT/GB2009/001339.

* cited by examiner

 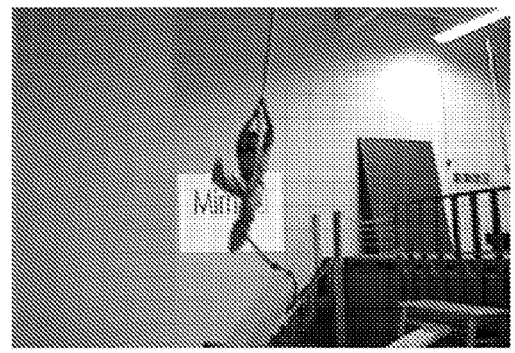
FIGURE 4A  FIGURE 4B
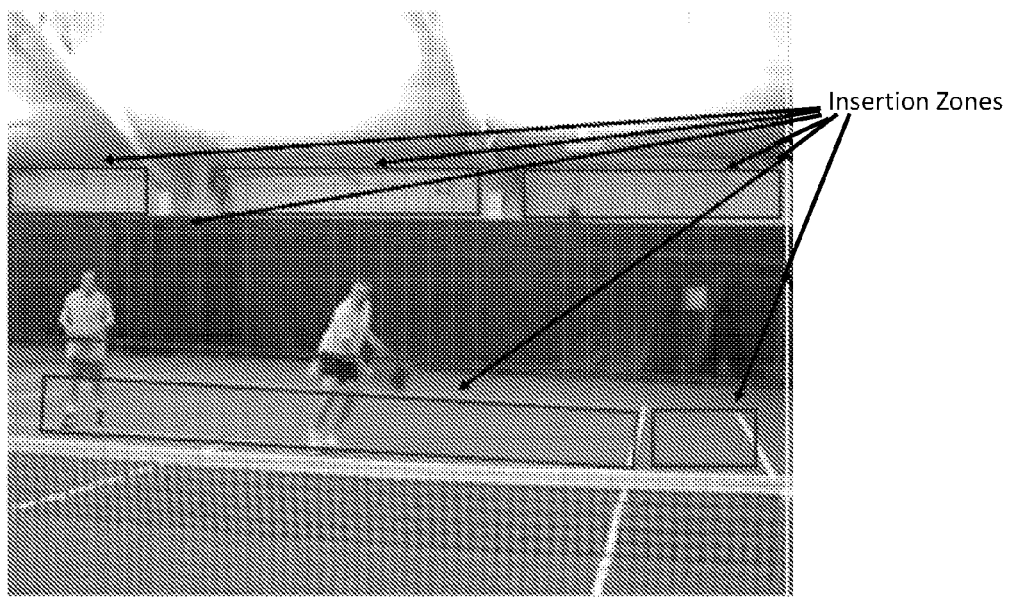
FIGURE 5

# US 9,477,965 B2

APPARATUS AND METHOD FOR IDENTIFYING INSERTION ZONES IN VIDEO MATERIAL AND FOR INSERTING ADDITIONAL MATERIAL INTO THE INSERTION ZONES

CROSS-REFERENCE TO RELATED APPLICATIONS

This application is a continuation under 35 U.S.C. §120 of U.S. application Ser. No. 12/954,766, filed Nov. 26, 2011, which claims priority to International Application No. PCT/GB2009/001339, filed May 28, 2009 (published by the International Bureau as International Publication No. WO/2009/144464 on Dec. 3, 2009), which claims priority to Great Britain Application No. 0809631.5, filed May 28, 2008. The entire contents of each of the above-referenced applications are hereby incorporated by reference.

BACKGROUND OF THE INVENTION

1. Field of the Invention

The invention relates to the apparatus and methods as set out herein, in particular for the identification and tracking of zones within video material in preparation for the placement of additional material (such as advertising components). The invention also relates to user-assisted insertion of additional material within video material.

2. Description of the Related Technology

It is well known to display advertisements, made of one or more graphical components before, during or after a television program or film. For example, a television program may be spliced into a plurality of segments and advertising components may be displayed in between spliced segments, before the television program and/or after the television program. However, the splicing of a program into segments often deteriorates a consumer's viewing pleasure when watching the program. Accordingly, this type of intrusive placement of advertising components is sometimes unpopular with consumers. In addition, the introduction of digital television set-top boxes, such as Sky Plus from BSkyB, means that a consumer can skip or fast forward advertising components. This often reduces the amount of revenue generated by the placement of advertising components.

It is also known to place advertising components strategically within a shot when recording a television program or film. For example, as illustrated in FIG. 1, Coca Cola™ containers are positioned on a table within a shot. This more subtle type of advertising is often more acceptable to the consumer. However, due to an increasingly global market where television programs and films are shown around the world, this type of advertising has limitations. For example, an advertiser may only have paid to advertise their product in one country, or brands may differ between countries. Furthermore, this type of advertising has to be considered prior to recording the television program or film etc.

The internet is becoming increasingly dominant in society due to its large and varied content. The internet comprises a plurality of types of video material such as, for instance films, television programs, sport events, or music events, which originate from, for example, film studios, broadcasters, and production companies, and so called user-generated video clips, which originate from non-professional content providers. The number of user-generated video clips available on the internet is increasing as a result of the increased number of video cameras and other recording devices, such as mobile telephones, having image and sound recording functions. These user-generated video clips have been known to reach a vast and diverse audience as a result of new modes of distribution including, but not limited to: video-based websites and user groups, such as www.youtube.com (recently acquired by Google); IPTV; and as a result of being emailed as attachments to multiple users. Through such modes, content can reach a "viral" status relatively quickly.

In order to utilize the vast reservoir of video material available on the internet, for advertising purposes it is advantageous to be able to embed advertising components into video material after recording of the video material. U.S. patent application Ser. No. 11/701,822 discloses apparatus and method for the insertion of advertising components into video material after recording. However, such processes can be time consuming since a human operator is required to view each media content item in order to determine whether there are any suitable zones within the item, within which an advertising component can be inserted.

Video material, may be audio visual material. Herein the term video material refers to moving images, and includes without limitation audio visual moving image material, such as films, as well as visual moving image material (usually with no sound). The term video material is also intended to cover stationary images, such as photographs and paintings. The term video material is intended to encompass internet or web based content, as well as material for distribution on traditional broadcast media, such as television and film.

SUMMARY

Embodiments of the invention seek to provide apparatus and methods for identifying and tracking zones within video material such as television programs or films etc. suitable for placement of advertising components.

According to an aspect of the present invention, there is provided a computer system configured to facilitate the insertion of graphical imagery in to video material, the computer system comprising a video input module for receiving a video clip in which a graphical object is to be inserted; a video analysis unit comprising one or more of forward and reverse video analysis modules capable of determining at least one insertion zone within the video material suitable for receiving graphic imagery to be inserted and configured to generate zone meta data defining at least image attributes of the placement zone; an insertion module arranged to receive graphical imagery for insertion into the zone and configured to synthesize video material incorporating the graphic imagery according to the zone meta data; and a file output module configured to generate an output comprising synthesized video material wherein the inserted graphical imagery is integrated with the original video material such that the video clip with the inserted graphical imagery is supplied to a software player and played as a single video file.

According to an aspect of the present invention, there is provided a computer system configured to facilitate the insertion of additional material into video material, the computer system comprising a video input module for receiving video material in which additional material is to be inserted; a video analysis unit comprising one or more of forward and reverse video analysis modules capable of determining at least one insertion zone within the video material suitable for receiving additional material to be inserted and configured to generate zone meta data defining at least image attributes of the insertion zone; a file output module configured to generate an output comprising the input video material and the zone meta data.

According to another aspect of the present invention, the zone meta data comprises image information relating to the insertion zone.

According to another aspect of the present invention, the image information comprises one or more of: tracking information; camera calibration information; lighting; color balance; occlusions and opacity; shadows; highlights; masking; which pixels belong to which object together with determined confidence levels; image grain; motion blur.

According to another aspect of the present invention, the computer system further comprises: an additional material insertion module for inserting additional material in to the at least one insertion zone within the video material.

According to another aspect of the present invention, the zone meta data further comprises additional material information regarding the inserted additional material.

According to another aspect of the present invention, the additional material information comprises one or more of: positioning of the additional material within the video material; start and end points of the additional material within the video material; size of the additional material; mask to be applied to the video material; video material identifier; additional material identifier.

According to another aspect of the present invention, the zone metadata further comprises an address of the additional material where the additional material can be retrieved from.

According to another aspect of the present invention, the file output module further generates metrics meta data.

According to another aspect of the present invention, the metrics meta data comprises instructions for a video material player to report to a server audit information.

According to another aspect of the present invention, the audit information comprises one or more of: pre-roll start; pre-roll end; video material start; additional material start; additional material end; video material end, post-roll start; and post-roll end; campaign ID; additional material ID; video material ID; customer ID; start of interactive graphic appearing contemporaneously with additional material; end of interactive graphic appearing contemporaneously with additional material; activation of interactive graphic.

According to another aspect of the present invention, the computer system further comprises: a remote video material player provided with video player software including a module for processing meta data while the video material is playing, said meta data being selected from one or more zone meta data and metric meta data.

According to another aspect of the present invention, the video player processes the zone meta data and outputs video material comprising the additional material integrated with the video material according to the zone meta data.

According to another aspect of the present invention, the zone meta data comprises the additional material.

According to another aspect of the present invention, the video player processes the metrics meta data and compiles an audit information report for the server, the audit information comprising one or more of: viewing milestones and viewing statistics, according to instructions in the metrics meta data.

According to another aspect of the present invention, the remote video player can process the zone meta data and the metrics meta data simultaneously.

According to another aspect of the present invention, the additional material comprises at least one object and at least one surface texture for application to the object.

According to another aspect of the present invention, different surface textures may be applied to at least one object for different distribution destinations.

According to another aspect of the present invention, the at least one object comprise a two-dimensional or a three-dimensional object.

According to another aspect of the present invention, the at least one surface texture comprise any texture capable of being applied to or wrapped around the at least one object.

According to another aspect of the present invention, the remote video material player further comprises: an insertion module arranged to synthesize and play out video material incorporating the additional material according to the video overlay and/or the zone meta data.

According to another aspect of the present invention, the additional material may be provided within the meta data or provided separately.

According to another aspect of the present invention, the additional material comprises graphical imagery.

According to another aspect of the present invention, the video material comprises a user-generated video clip; a film; a television program; a sports event; a music event; a static image.

According to another aspect of the present invention, the additional material comprises a static advertising components or an animated advertising component.

According to an aspect of the present invention, there is provided apparatus for automatic sensing of insertion zones for additional material, said apparatus comprising a video analysis unit configured to automatically determine at least one candidate insertion zone within the video material suitable for receiving additional material to be inserted and configured to generate zone meta data defining attributes of the insertion zone, wherein said automatic determination of insertion zones is based on one or more of feature shape, size, duration, movement, color; and an insertion module capable of receiving additional material for insertion and arranged to generate an output representative of the video material with the additional material placed on a insertion zone such that the additional material adopts the image attributes of the insertion zone as the video material is played.

According to another aspect of the present invention, the apparatus categorizes insertion zones and/or ranks the insertion zones.

According to another aspect of the present invention, the apparatus categorizes and/or ranks insertion zones using one or more of: shape, size, duration, color, monetary value.

According to an aspect of the present invention, there is provided apparatus for processing video material to automatically identify insertion zones for graphical imagery, said apparatus comprising a video analysis unit comprising one or more of forward and reverse video analysis modules capable of determining at least one insertion zone within the video material suitable for receiving graphical imagery to be inserted and configured to generate insertion zone meta data defining attributes of the insertion zone; and a user assisted insertion module providing a graphical user interface configured to enable the user to place graphical imagery into a scene of the video material and at the same time impart transformational information to the graphical imagery being inserted.

According to another aspect of the present invention, the transformational information is derived from affine mathematics or three-dimensional modeling.

According to another aspect of the present invention, the apparatus further comprises one more of the following image analysis modules: a non-rigid body tracking module; a rigid body tracking module; an object estimation module; an object tracking module; an ordering module; a segmentation module; a 3-D plane estimation module; an auto keying module; and a template matching module.

According to another aspect of the present invention, each tracking modules comprises one more of: a background motion detection module; a foreground motion detection module; an overlay module; and a crop detection module.

According to another aspect of the present invention, a plurality of the image analysis modules operate using parallel processors or parallel processing techniques.

According to another aspect of the present invention, the graphical imagery for insertion comprises one or more of: a still image; a still image including text; an animation; and other moving imagery.

According to an aspect of the present invention, there is provided a video output file including metadata, and overlay data in a downloadable package comprising a video player.

According to an aspect of the present invention, there is provided a method for identification of insertion zones within pre-recorded video material, the method comprising processing pre-recorded video material and identifying an insertion zone in at least one frame of the pre-recorded video material; tracking the identified insertion zone over an entire length of the pre-recorded video material; and identifying and tracking features of the pre-recorded video material which obscure all or part of the identified insertions zones.

According to another aspect of the present invention, the step of processing and identifying comprises identifying zones in at least one frame of the pre-recorded video material which complies with one or more predetermined rule, the one or more predetermined rules comprising shape of the insertion zone, size of the insertion zone, color of the insertion zone, duration of the insertion zone, movement of the insertion zone.

According to another aspect of the present invention, the shape of the insertion zone comprises: a rectangle, a triangle, a circle, a sphere, or a bottle shape etc.

According to another aspect of the present invention, the duration of the insertion zone comprises the insertion zone being visible for a predetermined period of time or a predetermined number of frames of the pre-recorded video material.

According to another aspect of the present invention, the size of the insertion zone comprises a predetermined percentage of a size of a frame of the pre-recorded video material.

According to another aspect of the present invention, the method further comprises: ranking the identified insertion zones based on the one or more predetermined rules.

According to another aspect of the present invention, the method further comprises: determining insertion zone metrics for the identified insertion zones.

According to another aspect of the present invention, the insertion zone metrics comprise one or more of: a size of the insertion zone; a duration of the insertions zone; a monetary value of the insertion zone.

According to another aspect of the present invention, the method further comprises: determining scene changes within the pre-recorded video material by determining a breakdown in visual similarity between a group of consecutive frames of the pre-recorded video material, and wherein a scene changes is determined where two sequential frames are no longer similar.

According to another aspect of the present invention, the method further comprises: determining cuts between cameras within the video material.

According to another aspect of the present invention, the method further comprises: marking the identified insertion zones within the pre-recorded video material.

According to another aspect of the present invention, the method further comprises: detecting features within the pre-recorded video material by detecting pixels of a frame which move together in the same rigid motion.

According to another aspect of the present invention, the method further comprises: detecting features within the pre-recorded video material by detecting pixels which are in the same area of the video material and are substantially the same color.

According to another aspect of the present invention, the method further comprises: determining a confidence factor associated with the detected features.

According to an aspect of the present invention, there is provided a method for inserting additional material into an insertion zone of pre-recorded video material, the method comprising inserting additional material into an insertion zone identified in one frame of pre-recorded video material; manipulating the additional material to incorporate perspectives; deriving information about the video material and the additional material from the manipulations applied to the additional material; inserting the additional material throughout the entire video material; and generating additional material metadata describing insertion of the additional material into the video material.

According to another aspect of the present invention, the manipulations comprise one or more of: resizing the additional material; adjusting a shape of the additional material, adjusting a perspective of the additional material, rotating the additional material.

According to another aspect of the present invention, the method further comprises: saving the video material together with the inserted additional material as one file.

According to another aspect of the present invention, the method further comprises: saving the additional material as an overlay separately from the video material, but associated with the additional material.

According to another aspect of the present invention, more than one additional material is inserted into the video material, and the more than one additional material are each saved as separate overlays, each associated with the additional material.

According to another aspect of the present invention, more than one additional material is inserted into the video material, and the more than one additional material are each saved as one overlay associated with the additional material.

According to another aspect of the present invention, the method further comprises: saving the video material together with associated additional material metadata.

According to another aspect of the present invention, the additional material metadata is saved in an associated file or as a file header.

According to another aspect of the present invention, the additional material metadata comprises one or more of: pre-roll start; pre-roll end; video material start; additional material start; additional material end; video material end, post-roll start; and post-roll end; campaign ID; additional material ID; video material ID; customer ID.

According to another aspect of the present invention, there is provided a method for analyzing pre-recorded video material to identify insertion zones, the method comprising forward analyzing each frame of the pre-recorded video material; and backward analyzing each frame of the pre-recorded video material in reverse order.

According to another aspect of the present invention, each frame of the pre-recorded video material is analyzed sequentially.

According to another aspect of the present invention, every nth frame of the pre-recorded video material is analyzed.

According to another aspect of the present invention, there is provided apparatus for analyzing pre-recorded video material to identify insertion zones, the apparatus comprising a rigid tracker module comprising a background motion detection module for tracking background rigid objects in pre-recorded video material; a foreground motion detection module for tracking foreground rigid objects in pre-recorded video material; and an overlay/crop detection module for tracking background rigid objects in pre-recorded video material; a non-rigid tracker module comprising a background motion detection module for tracking background non-rigid objects in pre-recorded video material; a foreground motion detection module for tracking foreground non-rigid objects in pre-recorded video material; and an overlay/crop detection module for tracking background non-rigid objects in pre-recorded video material.

According to another aspect of the present invention, there is provided a method for locating an insertion zone throughout pre-recorded video material, the method comprising identifying a template item within a frame of the pre-recorded video material; and analyzing the video material in order to identify the template item throughout the entire video material, the step of analyzing the video material comprising identifying at least one corner of the template item in a frame of the pre-recorded video material; and forward and backward scanning the entire pre-recorded video material to identify the at least one corner.

According to another aspect of the present invention, the method further comprises: apply one or more of: a threshold tolerance to the template item; a minimum duration tolerance to the template item; a minimum size tolerance to the template item; a color tolerance to the template item.

According to another aspect of the present invention, there is provided a method for identifying of insertion zones within pre-recorded video material and inserting additional material into the insertion zones, the method comprising processing pre-recorded video material and identifying an insertion zone in at least one frame of the pre-recorded video material; tracking the identified insertion zone over an entire length of the pre-recorded video material; identifying and tracking features of the pre-recorded video material which obscure all or part of the identified insertions zones; inserting additional material into an insertion zone identified in one frame of pre-recorded video material; manipulating the additional material to incorporate perspectives; deriving information about the video material and the additional material from the manipulations applied to the additional material; inserting the additional material throughout the entire video material; and generating additional material metadata describing insertion of the additional material into the video material.

According to another aspect of the present invention, there is provided a computer program product comprising program code means for performing the method described below.

According to another aspect of the present invention, there is provided a computer readable medium recorded with computer readable code arranged to cause a computer to perform the method described below.

According to another aspect of the present invention, there is provided a computer program code means for performing the method described below.

BRIEF DESCRIPTION OF THE DRAWINGS

For a better understanding of the invention and as to how the same may be carried into effect reference will now be made, by way of example only, to the accompanying drawings, in which:

FIG. 4A illustrates a frame of video material;

FIG. 4B illustrates the frame of video material of FIG. 4A comprising additional material;

FIG. 5 illustrates a frame of video material with identified insertion zones;

DETAILED DESCRIPTION OF CERTAIN INVENTIVE EMBODIMENTS

Additional advantages and novel features of the invention will be set forth in part in the description which follows, and in part will become apparent to those skilled in the art upon examination of the following and accompanying drawings or may be learned by practice of the invention.

The apparatus and method described herein enable the automated identification of insertion zones and the automated placement of additional material (graphical imagery, for example advertising components) into the insertion zones within pre-recorded video material, thus enabling large volumes of video material to be processed relatively quickly for subsequent advertising purposes, without expensive human operation. A human operator is only required (if desired) to approve identified and tracked insertion zones prior to making them available to the advertiser directly and on-line.

Figure 1:
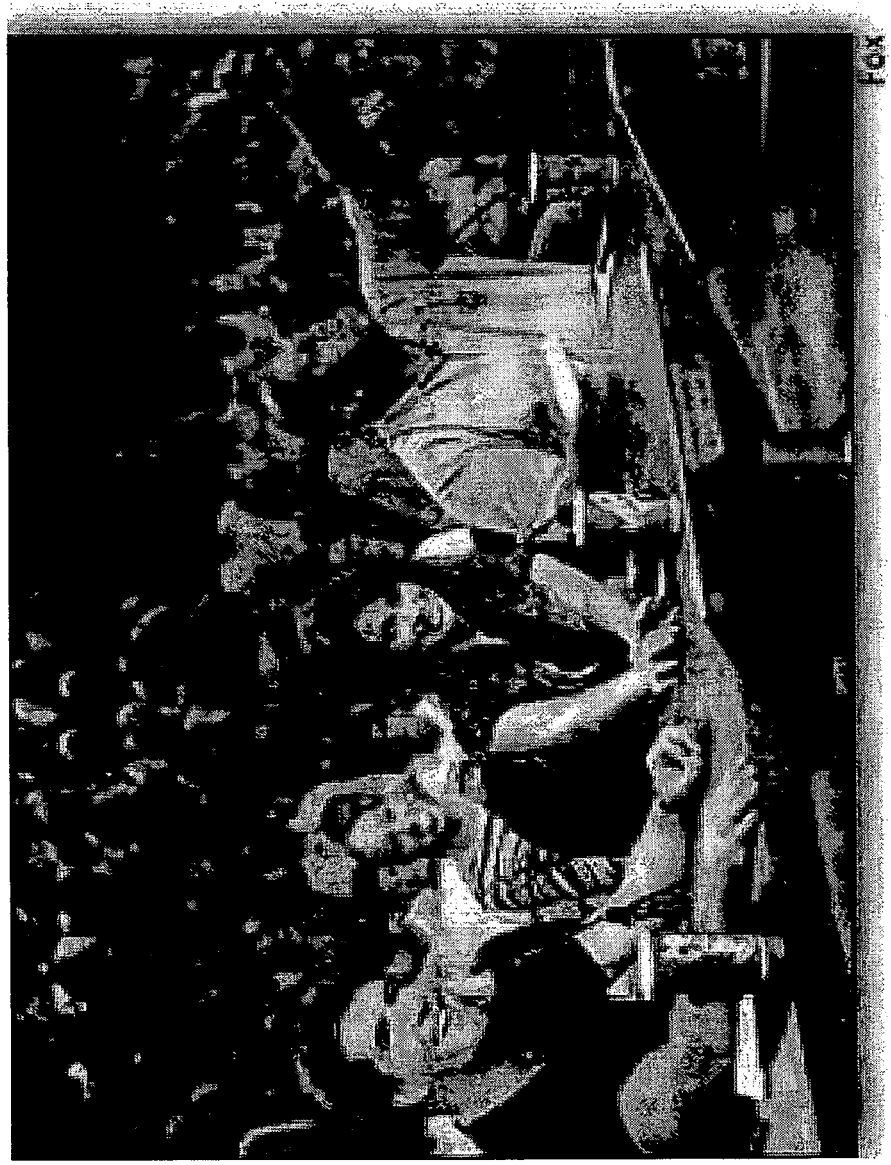
FIG. 1 illustrates the placement of Coca Cola™ containers on a table during the recording of a television program.
Figure 2:
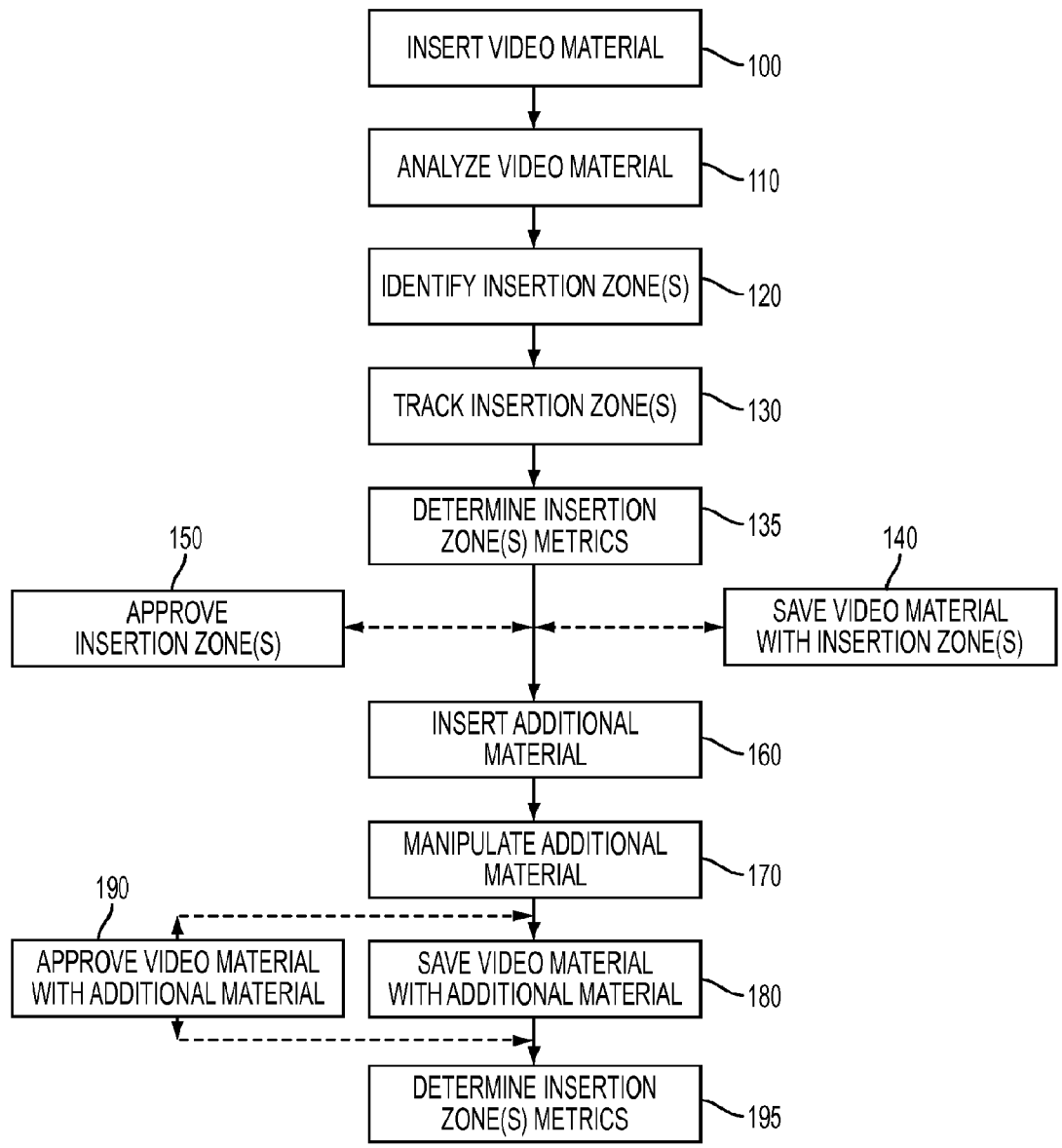
FIG. 2 illustrates a process for identifying insertion zones and inserting additional material into video material.

FIG. 2 illustrates an overview of one method for identifying insertion zones and inserting additional material (graphical imagery) into video material. Video material is inserted into the apparatus for processing (step 100). The video material is analyzed (scanned) at step 110 and additional material insertion zones are identified (in at least one frame of the video material) at step 120. As known in the art, video material comprises a plurality of frames, which when run together form a moving image. Search rules such as shape of insertion zone and size of insertion zone coupled with filter rules such as color and movement (explained in further detail below) are used in order to identify insertion zones within each frame of the video material. The analyzes and identification steps (110 and 120) may identify any number of insertion zones from 0 to n.

The shape of the insertion zone can be any shape specified by a user. A basic example is rectangular areas (i.e. areas consistent with rectangular areas under varying camera viewpoints). Rectangles are advantageous since conventional advertisements are normally rectangular and rectangles usually represent picture frames, windows or TVs within the video material. However, any shape may be specified, such as triangles, circles, spheres, bottles etc. The area of the insertion zone is required to be consistent through (sections of) the video material, and visible for a predetermined period of time. For instance the zone may align with an existing object moving in the image, or with a particular 3D trajectory consistent with (part of) the viewed scene. Other filter rules may be set in order to identify areas of specific colors, for instance skin color, or large coherently moving areas. These rules enable the identification of insertion zone that meet a predetermined zone quality criteria.

The size of the insertion zone is also considered. In one embodiment, the predetermined size of the insertion zone must be at least 15% of the total size of a frame of the video material. However, other percentages may be used as required.

In addition, the apparatus of the present invention is able to rank the identified insertion zones within the video material based on the search rules. For example, a rectangular insertion zone (which in this embodiment is determined to be the most desirable shape) which is 30% of the total size of a frame of the video material, is ranked higher than a rectangular insertion zone which is 20% of the total size of a frame of the video material, and higher than a circular insertion zone which is also 30% of a frame of the total size of the video material. The highest ranked insertion zones indicate the most desirable advertising zones.

Once identified in a single frame of the video material, the insertion zones are tracked over the entire length of the video material or until they disappear (step 130). Again, search rules, for example, the duration of the insertion zones appearance, are used. If the insertion zone is only visible for less than a predetermined period of time over the entire length of the video material, then that insertion zone is not considered appropriate and is disregarded. Any inserted additional material, such as advertisements, can then be displayed for the predetermined period of time when the video material is played.

Identified insertion zones which have a predetermined size (in one embodiment as a percentage of the frame size) and which are visible for more than a predetermined period of time, over the entire length of the video material, are then considered to be candidate insertion zones suitable for the insertion of additional material. However, the identification of a candidate insertion zone does not necessarily result in additional material been inserted into the candidate insertion zone.

Metrics for the candidate insertion zones can be determined at step 135, such as the size of the insertion zone, the duration of the insertions zone, in time or as a percentage of the running time of the video material, an approximate value (in money) of the insertion zone, if a purchaser wanted to place additional material in the insertion zone etc. In one embodiment, the value may be provided on a per region basis.

During tracking of the insertion zones at step 130 features (or objects) which obscure all or part of the identified insertions zones are identified and tracked. For example, with reference to FIGS. 8A and 8B, a person can be seen to be traveling across the insertion zone 800. By identifying and tracking such an object (in this case, the person) it is possible to insert additional material which blends seamlessly with the original video material.

The video material with the identified insertion zone(s) may then be saved (step 140). If no insertion zones are identified, then the video material is not saved. Step 140 is optional and therefore illustrated with a dotted line.

A further optional step is for the identified insertion zone(s) to be approved by a human operator at step 150. The process of FIG. 2 can be stopped at this point or can continue to step 160. The additional material, which may be an advertisement, can then be inserted into the identified insertion zone (step 160). If more than one insertion zone is identified, different additional materials (or multiples of the same additional material) can be inserted into the more than one insertion zones within the same video material. In addition, different additional materials, e.g. different advertisements, may be inserted into the same insertion zone depending on the region in which the video material is to be viewed. For example, first additional material (a first advertisement) may be inserted into an insertion zone for viewing in the USA and a different second additional material (a second advertisement) may be inserted into the same insertion zone for viewing in the UK.

Following insertion, the additional material is manipulated at step 170 (described in more detail below). This enables for instance advertisements to be inserted with lifelike motion and appearance. Finally, the video material with inserted additional material is saved (step 180).

In one embodiment, the video material and inserted additional material are saved as a new file. However, this often creates large files. Therefore, in another embodiment, the additional material is saved in a separate file from the video material and is embedded on the fly. In other words, the additional material can be saved as an overlay, such that when the video material file and the additional material file are viewed simultaneously, it appears to a viewer as if the additional material is inserted into the video material when in reality it is overlaid on top of the video material. In another embodiment, metadata describing the placement of the additional material is saved with the video material, such that when the metadata is suitably processed, the additional material is inserted into the video material for viewing.

Another optional step is for the identified insertion zones to be approved by a human operator after insertion of the advertisement at step 190.

Another optional step is for the apparatus to determine metrics for each insertion zone, such as, the duration of each insertion zone in time or as a percentage of the running time of the video material, an average size of the insertion zone (in one embodiment as a percentage of the frame size), and/or an approximate value (in money) of the insertion zone, if a purchaser wanted to place additional material in the insertion zone etc. (step 195). In one embodiment, the value may be provided on a per region basis.

The process of determining insertion zone(s) in video material (steps 100 to 150) may be separate from the process of inserting additional material into the insertion zone(s) (steps 160 to 195). For example, insertion zone(s) may be determined, then at a later stage additional material may be inserted into selected insertion zone(s). The two processes may be perform by separate operators at different sites, or by the same operators.

The step of tracking the insertion zone (step 130) involves determining where a scene changes within the video material, such that the identified insertion zone is no longer in view. The apparatus of the present invention recognizes the scene change by determining when a particular insertion zone in the video material is no longer visible and switches off the insertion zone at that point. In one embodiment, the apparatus is also capable of detecting and modeling subtle scene changes within the video material such as detecting fade and dissolve and then manipulating an advertisement to reflect these scene changes. This process is described in further detail below.

The apparatus of embodiments of the present invention is also capable of determining cuts between cameras within the video material. This ensures that an insertion zone is tracked from one scene to another and each insertion zone is identified and located throughout the entire length of the video material. Therefore, for example, if after a cut following a change of camera/scene the video material cuts back to the previous camera/scene, then the insertion zone (and any inserted advertisement) is identified (visible) once more. The apparatus then relocates the insertion zone. Therefore, an insertion zone is followed in every frame of the video material.

Thus, following analysis of video material at steps S11 the apparatus of the present invention may identify zones which are suitable for the placement of additional material such as an advertisement. In one embodiment, the apparatus may inform a user of the suitable zones, and the apparatus may illustrate these zones by an appropriate marker. According to one embodiment, only one or a few frames of the video material are marked. According to another embodiment the apparatus may mark the zones in each frame of the material. However, such marking is for illustrative purposes only and will not show once an advertisement (or other additional material) has been inserted into the zones, or when the video material is viewed following processing if not all, or indeed none, of the zones comprise advertisements.

Figures 3A, 3B, 3C, 3D:
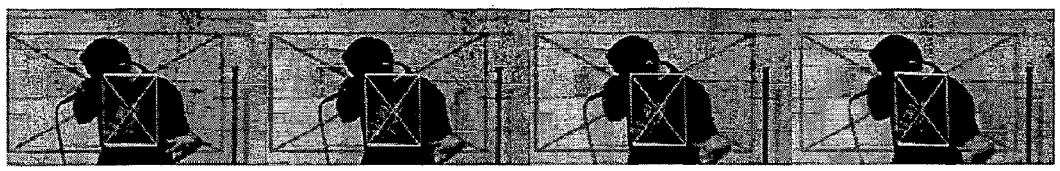
FIGS. 3A to 3T illustrate sequential frames of video material.
Figures 3E, 3F, 3G, 3H:
Figures 3I, 3J, 3K, 3L:
Figures 3M, 3N, 3O, 3P:
Figures 3Q, 3R, 3S, 3T:

FIGS. 3A to 3T illustrates sequential frames of a video material comprising two tracked zones. In this example, a background zone is represented by a large rectangle on the wall, and a foreground zone is represented by a smaller rectangle on the person.

The apparatus of the embodiments of the present invention tracks coherently moving pixels to determine candidate insertion zones tracked throughout the video material. In order to track motion within the video material, the spatial distortion of images of a surface through time can be modelled as time-varying 2D transformations of each image. 2D projective transformations include 2D offset (translation), rotation, scale, shear and elation (pure projective distortion). In one embodiment, a planar tracking algorithm computes these transformations in each image. The planar tracking algorithm may comprise a first step of finding the offset of the image that maximizes the correlation between images, in order to approximately register the images (determine how they are related geometrically), and a second step of optimizing the transformation parameters. This method may be implemented for graphics processing units (GPUs).

The process involves combining a detailed geometric model of the scene-to-image projection (in a smooth area of the scene) with the use of unprocessed raw pixels as the data source. This is in contrast to geometric methods based on image features, which tend to give less precise results because they use processed features instead of unprocessed pixels. This improves the accuracy of the frame-to-frame motion estimates. Planar tracking based on direct pixel-based methods is also extremely resistant to image and noise blur.

The algorithm requires two images as input, a "source" image and a "target" image. The "source" and "target" image may be consecutive in time or separated. If separated "source" and "target" images are selected, then approximate registration (geometric relationship) information needs to be provided, because the correlation search is limited to a small range translation, rotation and scale. In order to track over a long time interval, consecutive frames are tracked, followed by repeating the optimization over longer time steps to reduce the tracking drift.

For example, the pixels of the wall of FIGS. 3A to 3T exhibit substantially the same movement throughout the various frames. Therefore, the apparatus of the present invention is able to determine that the pixels all form part of the same feature (in this case, the wall). In addition, the pixels making up the person exhibit the same movements, consequently it can be determined that they make up a feature (in this case, the person), which is a different feature to the pixels making up the wall.

In addition or alternatively, the apparatus may use rigid motion estimation in order to determine that a plurality of pixels (of a frame of video material) all form part of the same insertion zone. In rigid motion estimation an algorithm detects which pixels of a frame move together according to the same rigid motion and determines the corresponding 3D rotation and translation (or other representation of the 3D motion such as projective 3D motion). It effectively detects the dominant motion in a moving scene. The algorithm tracks features between frames, which may be consecutive or separated in time, and returns the motion. It is also possible to detect multiple motions under certain conditions. This method may be implemented for graphics processing units (GPUs).

In addition or alternatively, the apparatus may use color based matching in order to determine that a plurality of pixels (of a frame of video material) all form part of the same insertion zone. In color based matching an algorithm may calculate a color histogram from an input image (a frame of video material, or an item within a frame of video material (the template)). An image sequence (several sequential frames of video material) can then be analyzed by computing the color histogram for each of the frames and intersecting the histograms with the template to give a template match score. The histogram intersection process may be implemented in CPU code as understood by a person skilled in the art. Each frame in the sequence is analyzed one at a time, independent of any other frames, and given a template match score. From the template match score it is possible to determine that a plurality of pixels within a frame have substantially the same color and therefore are likely to form part of the same feature, and that a plurality of pixels within a sequence of frames have substantially the same color and therefore are likely to form part of the same feature. This method may be implemented for graphics processing units (GPUs).

For example, the pixels of the wall of FIGS. 3A to 3T have substantially the same color throughout the various frames. Therefore, the apparatus of the present invention is able to determine that the pixels all form part of the same insertion zone (in this case, the wall).

In addition or alternatively, the apparatus may use texture based matching in order to determine that a plurality of pixels (of a frame of video material) all form part of the same insertion zone. In texture based matching a frame of video material (the template) and a sequence of frames of the video material are input. The method detects features in the template and in each frame of the sequence and tries to match them. If enough features in the template can be matched to features in a frames of the sequence, then the frame is considered a positive template match. Each frame in the sequence is analyzed one at a time, independent of any other frames, and given a template matching score.

Region segmentation may also be used in order to group pixels based on color and/or texture. In region segmentation, an algorithm may be used in order to detect regions of similar pixels within each frame, and regions of similar pixels across a sequence of frames. The algorithm may be based on Mean Shift, which is a non-parametric clustering algorithm, used to group color pixels in the XYT volume space (e.g., in the X, Y and time planes). In one embodiment, the apparatus identifies the side, top and bottom of blank areas of the frames in order to identify suitable insertion zones. By identifying the side, top and bottom of the zones, it is possible to ensure that insertion zones do not overlap the edges of the frame. In addition, the apparatus is able to identify fixed overlays in the video material, which need to be taken into account when inserting advertisements (or other additional material). Fixed overlays may be, for example banners of text which are inserted over video footage, such as News bulletins.

Furthermore, the apparatus may use an algorithm, or other appropriate method to detect the presence of black bars around each frames of video material. The presence of black bars can be interfere with various video processing algorithms, so it is necessary to detect them in order to ignore them. The apparatus analyzes the variations of the pixel content across a sequence of video material and identifies the border pixels which have little variation (i.e. low standard deviation) and have low intensity (i.e. low average RGB values). Border pixels which have little variation and low intensity are considered to be black bars and are ignored during any other processing of the frame. The process may be implemented in CPU code as understood by a person skilled in the art.

Furthermore, the apparatus may use an algorithm, or other appropriate method to detect the end of a scene, whether a hard cut, or a fade. In one embodiment, in order to determine a scene cut, the method detects a breakdown in visual similarity between a group of consecutive frames, where two sequential frames are no longer similar it is determined to be a scene cut. For faded scenes, the similarity between the frames will gradually reduce until there is no similarity. In one embodiment, a spectral clustering algorithm (as known in the art) may be applied to a similarity matrix of frames.

In another embodiment a KLT tracker (described below) can be used in order to determine a scene cut, when a large proportion of feature point has disappeared.

Both approaches require parsing the entire sequence and a decision every n (e.g. n=100) frames in order to detect gradual changes.

It is advantageous to determine scene changes in order to increase processing speed. For example, if an insertion zone has been identified in one scene of the video material, it is then possible to skip through the video material on a scene by scene basis in order to identify further instances of the insertion zone in the video material.

A KLT tracker is a multiresolution 2D feature point tracker algorithm. The algorithm detect and tracks feature points from frame to frame. Feature points correspond to locations within a frame which are characteristic in visual appearance i.e. they exhibit a strong contrast (such as a dark corner on a bright background). Features are detected in the first frame and then individually tracked in the next frame by comparing the similarity of its neighbor pixels. New features are also detected in each new frame. The multiresolution 2D feature point tracker enables features to be tracked even when there is motion blur by considering large vicinities around the feature points. This method may be implemented on GPUs. The insertion zones are located throughout the video material, both within each frame, within each scene and through various scenes in which that zone can be found. If a zone is identified which gives unstable tracking, and cannot be located in other frames of the video material or overlaps other zones which are preferred on the basis of predetermined zone quality criteria, then these identified zones are considered unsuitable and are disregarded.

In addition, the advertisement (or other additional material) inserted into the background retains the effects of the foreground object naturally passing in front of it, e.g. a shadow which passes over the identified zone of the background passes over the advert following insertion into the background.

As well as identifying insertion zones, the apparatus of the present invention identifies zones which correspond to objects which obscure some or all of the insertion zones at frames throughout the video material. Masks are then created for the objects which obscure some or all of the insertion zones. The process compares pixel colors in different frames. The method builds color space models for foreground and background pixels and calculates mixture models of foreground and background colors as an alpha value in each pixel of the embed area. The method then outputs its result as an additional alpha channel for every frame in the processed video stream. The pixels of the alpha channels represent all occlusions for the particular layer in the video stream. The alpha values calculated for pixels allow mixing embed and background colors to produce effect of occlusion or semi transparency in the scene. For instance, an alpha value of zero would give rise to a transparent foreground embed and allow the background to show through. An alpha value of one would give rise to an opaque embed pixel.

An algorithm may implements this method using a mixture of GPU and CPU calculations.

In one embodiment the method allows for human correction to produce more accurate result. The method may even learn from the human corrections in order to increase the reliability of later calculations.

The creation of masks is driven directly from the automatic tracking, so it involves little or no intervention by a human operator. It is therefore very efficient. It replaces the need for rotoscoping in many. Rotoscoping is a time-consuming technique in which objects in the foreground need to be traced over, frame by frame, in order to create an accurate mask and effectively insert an image behind the foreground object. However, rotoscoping may still be used in order to create masks for the objects which obscure some or all of the insertion zones.

FIG. 4A illustrates a frame of video material and FIG. 4B illustrates the same frame of video material having an advertisement inserted into the background. Note that the advertisement has been inserted seamlessly such that the human in the foreground is not obscured. In order to achieve this a mask was created for the human in the foreground, which is obscuring some of background, such that when the advertisement is inserted into the background, the human appears to pass in front of the advertisement. In fact the advertisement has a piece removed, the size and position of the mask in each frame of the video material.

FIG. 5 illustrates insertion zones which have been identified, prior to insertion of an advertisement.

According to embodiments of the present invention, it is also possible to perform user-assisted insertion and tracking. In this embodiment, the apparatus of the present invention can be used by a user in order to insert additional material into video material.

Figure 8A:
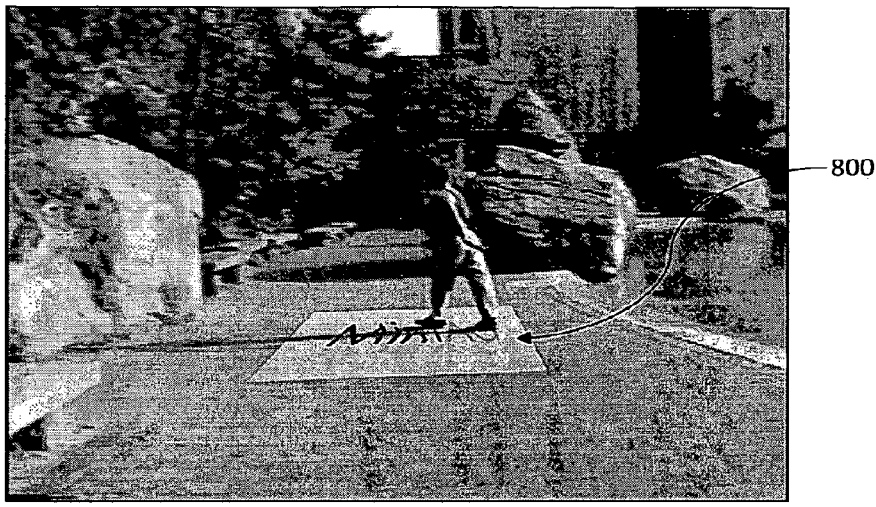
FIGS. 8A and 8B illustrates a frame of video material comprising additional material.
Figure 8B:
Figure 9:
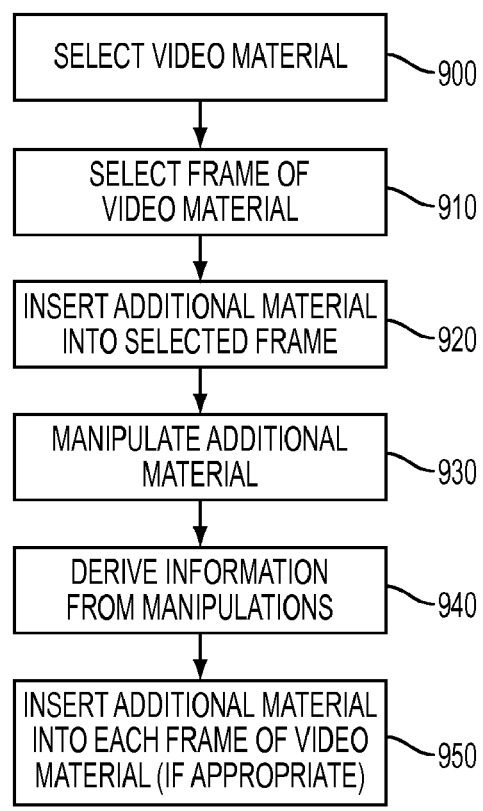
FIG. 9 illustrates a process for inserting additional material into video material.

FIGS. 8A and 8B illustrate a frame of video material comprising inserted additional material 800 and FIG. 9 illustrates a process of user-assisted insertion. As illustrated in FIG. 9, the user selects video material at step 900. The user then selects a frame of the video material, where the video material is paused (if the video material is not stationary) at step 910. The user inserts the additional material 800 into (an insertion zone of) the frame of video material (step 920) and manipulates the additional material (step 930). The manipulations may be implemented in software using offline transformations or 3-D modeling and preferably include resizing the additional material, changing the shape of the additional material, changing the perspective of the additional material, rotating the additional material, etc. The user performs these manipulations until they are satisfied with the placement of the additional material 800 in the frame of video material. As can be seen more clearly in FIG. 8B, the additional material in FIG. 8B has been manipulated by the user to be trapezium shaped, so that the additional material blends into the pavement on which it is situated, to take account of the perspective of the scene. Following manipulation of the additional material the apparatus of the present invention is able to derive information about the additional material from the user manipulations applied to the additional material (step 940). For example, in FIGS. 8A and 8B the additional material has been manipulated to be trapezium shaped to take account of the perspective, from this the apparatus can determine the perspective from which the video material was taken. The apparatus then applies the additional material to the entire video material. For example, the apparatus processes the video material such that the additional material is applied to each frame and manipulated as necessary so that it blends seamlessly into each frame (step 950) of the entire video material.

If the area into which the additional material has been inserted by the user moves out of the shot, then the additional material will move out of the shot, and then if the area comes back into shot so will the additional material. Furthermore, if the area into which the additional material is inserted is obscured in any of the frames of the video material, then the additional material is also obscured, such that the additional material appears as if it was in the frame when the video material was shot.

Thus the apparatus of the present invention enables simple additional material insertion by a user into any place the user deems appropriate, and with manipulation tools enabling the user to import transformational information to the process of placement. The user is only required to insert the additional material into one frame and the apparatus inserts and manipulates the additional image in each of the frames for the video material.

Figure 10:
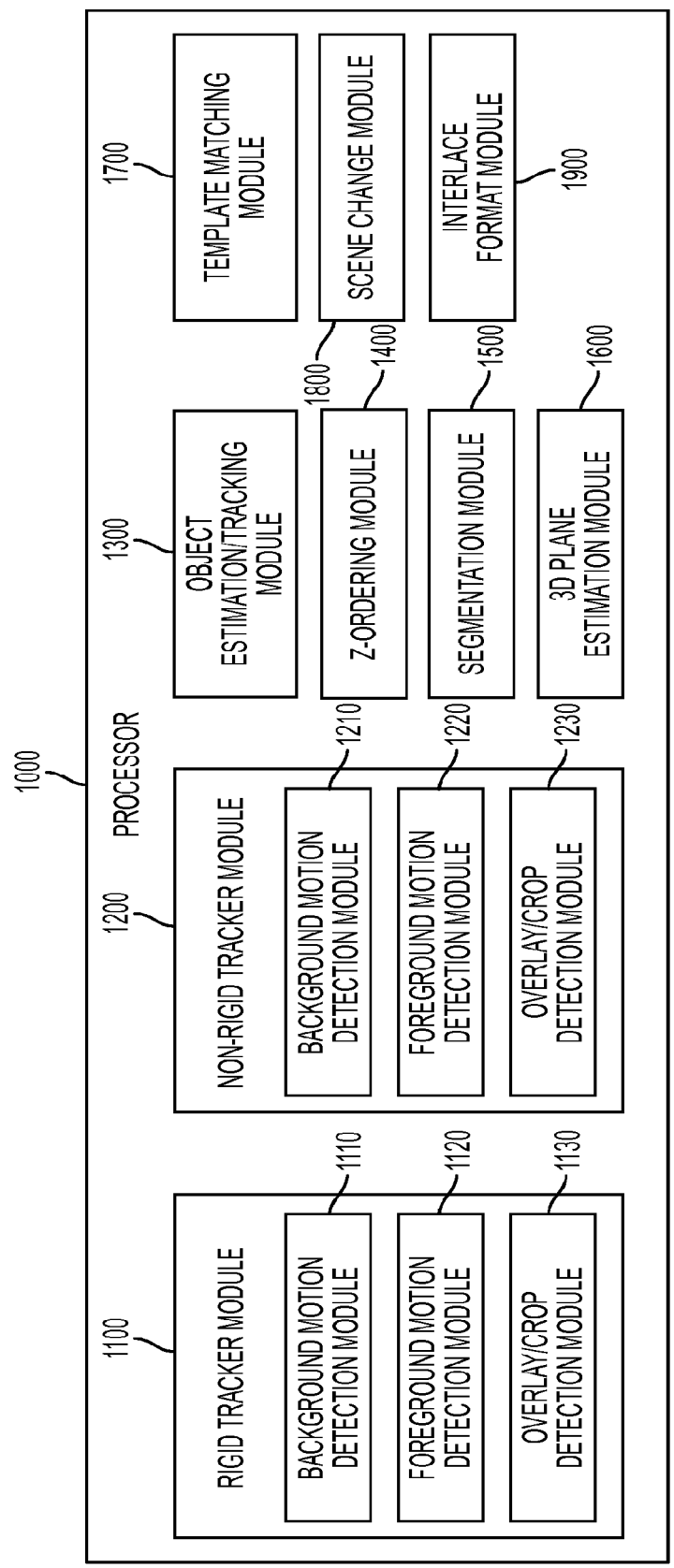
FIG. 10 illustrates an apparatus for analyzing the video material.

In order to process the video material the apparatus analyzes the content of the video material. FIG. 10 illustrates schematically apparatus for analyzing the video material.

In order to analyze the video material, the apparatus of the present invention performs forwards and backwards analysis of the video material. The forward and backward analysis can be performed by one processor, which forward processes the video material and then backward processes the video material, or vice versa, or can be performed by two processors working in parallel, one forward processing the video material whilst the other backward processes the video material.

As illustrated in FIG. 10, the processor 1000 comprises two tracking modules, a rigid tracker module 1100 and a non-rigid tracker module 1200. The rigid tracker module 1100 track objects within the video material which tend not change shape, such as walls, floors, and such like. The non-rigid tracker module 1200 tracks objects within the video material which are not rigid and may change shape or contour, such as curtains, humans etc. Both tracker modules 1100, 1200 comprise a background motion detection module 1110, 1210; a (multiple) foreground motion detection module 1120, 1220 and an overlay/crop detection module 1130, 1230. The background motion detection modules 1110, 1210 track any rigid/non-rigid objects respectively, which are in the background of the video material. The foreground motion detection modules 1120, 1220 track any rigid/non-rigid objects respectively, which are in the foreground of the video material. The overlay/crop detection modules 1130, 1230 determines whether any overlays are present in the video material and determines the edge of each frame of the video material, where the video material has been cropped. An overlay, may be for example, a banner which has been overlaid onto the video material, such as, a new banner across which current news is scrolled during news broadcast video material.

The processor 1000 of the present invention uses multi-resolution scanning, where each frame of the video material is analyzed by looking at the image from different distance, i.e. looking at different sized resolutions such that different levels of detail can be examined.

The processor 1000 also comprises an object estimation/tracking module 1300, a Z-ordering module 1400, a segmentation module 1500 a 3D plane estimation module 1600, a template matching module 1700, a scene change module 1800, and an interlace format module 1900.

The object estimation/tracking module 1300 detects objects using pixel and color motion. For example, if a lot of pixels which are in the same area of the video material and are the same (or substantially the same) color are moving in one direction, then those pixels are determined to be (together) one object. It determines which pixels belong to which object and a confidence factor, based on the determinations, is provided.

The Z-ordering module 1400 determines the ordering of objects front to back within the video material along the Z axis. For example, the Z-ordering module 1400 determines the order in which the objects are present in the video material with reference to the camera, i.e. which objects are nearest the camera, and which objects are furthest away from the camera, and thus which objects pass in front of other objects.

It is possible to determine between background and foreground components of the video material since, each component has different motion. For example, in a video clip following a person walking down the street, the person moving in the foreground will have different motion to the background. The background is also moving since the camera follows the process of the person, but the background movement is different from the movement of the foreground person.

The segmentation module 1500 determines areas (insertion zones) within the video material which could be used for additional material insertion, such as a continuous area of pixels within the foreground and the background.

The 3D plane estimation module 1600 determines planes within the video material, and tracks the determined planes throughout the video material. For example, the ground of FIGS. 8A and B is all one plane.

Figure 21:
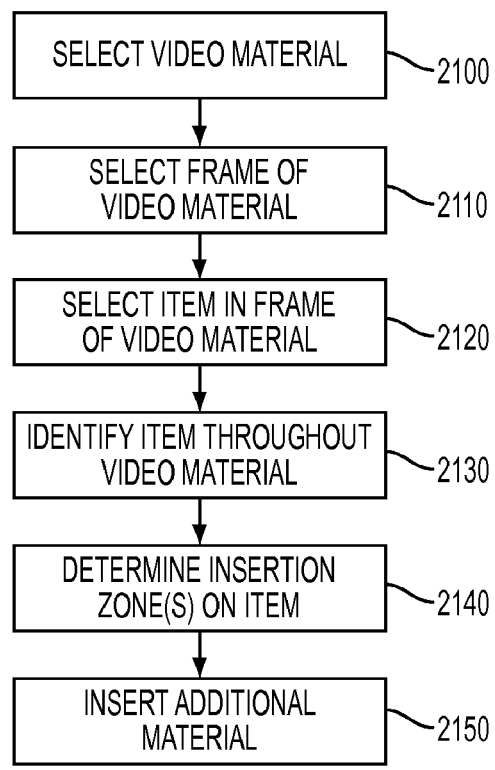
FIG. 21 illustrates a process for template matching.

The template matching module 1700, can be used to track a template throughout video material. FIG. 21 illustrates a process for template matching. As illustrated in FIG. 21, video material is selected at step 2100. A frame of the video material is then selected at step 2110 and an item (template) within the frame selected at step 2120. The item may be an object, such as a table top, window, picture frame etc. appearing within the video material. In one embodiment a user may select the item. The template matching module 1700 then analyzes the video material in order to identify the item throughout the entire video material at step 2130. An insertion zone is then determined on the item at step 2140 and additional material inserted at step 2150.

In order to identify the item throughout the entire video material at step 2130 the apparatus may perform corner matching. The corners of the item are identified (at step 2120) in the selected frame, rather than the entire item. The item corners are then identified throughout the entire video material (at step 2130). This process enables faster matching since a pixel by pixel comparison of each frame with the item is avoided.

This process is advantageous if additional material is to be inserted into an entire back catalog of a television series. For example, a television series is likely to use the same set in a plurality of episodes. If a table top, which appears in numerous episodes is identified in one frame, the template matching module 1700 can analyzes the entire series and insert additional material (an advertisement) onto the table top, at each instance it appears throughout the series, providing greater continuity.

Thresholds may be applied to the item (template). This is because the same item (for example table top), may appear at slightly different perspectives in different shots, or may appear at different distances from the camera. Therefore, in order to accurately identify the same item, the threshold tolerances are applied. In addition, a minimum duration tolerance may be applied, such that if the item only appears for less than a predetermined period of time (in that frame/in those frames), the item is not identified for insertion of additional material. In addition, a minimum size tolerance may be applied, such that if the item appears as less than a predetermined size, the item (in that frame) is not identified for insertion of additional material. In addition, a color tolerance may be applied, such that if the color of the item varies (within the predetermined tolerance range), the item is still identified.

The scene change module 1800 determines when there is a scene change within the video material, whether it be a hard cut or a fade.

The interlace format module 1900 determines the format of the video material. Digital video material may often be interlaced whereby the rows (or the entire frames) are swapped. This interlacing operation happens when a video has been converted from one frame rate to another for compatibility between television broadcast and film standards. It is necessary to detect the format in order to recover the original video stream before doing other processing. The interlace format module 1900 may use an algorithm to detect the interlacing format from: progressive plain; pulldown progressive, interlaced (upper or lower field first) and pulldown. The module 1900 works by testing each format hypothesis, reconstructing the original video material and then choosing the most likely format based on the consistency of motion flow. The entire video material may be analyzed by the module 1900, since the format can vary within a sequence. However, it is normally possible to determine the interlacing format within a few frames.

"Keying" analysis is the order of objects before any of the additional material is inserted. Keying displays pixels which are not occluded, and uses the ordering to supply the relevant pixels. According to this analysis, an estimation is made per pixel in a given image as to which object a particular pixel belongs, including any additional inserted materials. A pixel color value is also estimated.

The modules of the processor 1000 work together in order to analyze the whole video material. The results of the analysis are saved in zone metadata files, preferably one file for each suitable insertion zone. For example, the zone metadata may comprise information regarding the positioning of the insertion zone; tracking information such as the motion of objects and the motion of the camera; camera calibration information, such as focal distance, aspect ratio and distortion; lighting; color balance; occlusions and opacity of the additional material; shadows; highlights; masking, such as key, mask (including gray levels), matt; what pixels belong to which object together with the determined confidence levels; image grain, such as digital noise; motion blur (for each pixel direction and z magnitudes); start and end points of the insertion zone; overlay size, area and mask; the additional material ID; a campaign ID; a video material ID etc. The metadata may also provide the address of the additional material where the additional material can be retrieved from if is it not provided as an associated file.

Following processing of the video material, additional material (advertising components) can be inserted into the video material. The resultant video material can be saved in one of several arrangements. Following processing this video material comprising the additional material can be saved as either a new file, or can be saved over the original file.

Alternatively, the additional material can be provided in a separate layer, such that the original video material file and the overlayer file are viewed simultaneously to provide the appearance of the additional material being inserted into the video material. In this embodiment, if there is more than one additional material to be inserted in to the video material, either each additional material can be provided on a separate overlayer, or all of the additional material may be provided on one overlayer. The overlayer may be the same size as the original video containing the additional material, but it could be as small as the minimum rectangle that contains the additional material. If the overlayer is of smaller size, then the video overlayer may contain parts of the original video combined with the additional material and may be positioned on top of the original video during playback. In another alternative embodiment, the video material may be provided with zone metadata, either in an associated file or as a file header. The zone metadata contains data defining the insertion zone and image information and the company stored within the video file or in association with it.

The metadata defines at least one insertion zone which has been identified within the video material. Therefore, additional material can be provided with the video material and appear to be inserted in the insertion zone(s) of the video material.

The additional material can then be provided in a separate file to the video material and be inserted into the video material on the fly at the player machine. The arrangement reduces storage size, since a 2 hour video material may only require additional material for 15 seconds. Consequently, there is no need to process all of the video material and re-encode all of the video material comprising the additional material. Instead the metadata specifies the start point (when the additional material should be inserted) and the stop point (when the additional material should be stopped) within the video material, the zone itself and how the additional material should be manipulated, as the video progresses.

Therefore, the video material can be provided with metadata and a separate additional material file and when played, the additional material is inserted into the video material. Therefore, the original video material is never re-encoded making it quicker to store the data and enabling smaller data transfers.

By providing the additional material as an overlayer or by providing metadata, it is possible to insert different additional material in dependence of the viewing country/region. For example, it may be desirable to insert an advertising component in one country and a different advertising component in a different country, or it may be desirable to insert different versions of the same advertising component in respect of different countries. For example inserting the same advertising component, but in different languages, when viewed in different countries.

Alternatively the video may be re-encoded with different additional material included in different versions of the video and such different versions may be requested by the player depending on date, location or campaign availability.

It is possible to insert either two dimensional additional material (which may appear to be three dimensional in some embodiments) or to insert three dimensional additional material.

In one embodiment, it is possible to create insertion zones in the form of 2D or 3D objects within the video material and then to wrap appropriate surface texture around the insertion object. For example the insertion zone may be suitable for a 3D representation of a blank drinks can, then the texture could be the image of a Coca Cola™ can or a Sprite™ can etc.

In one embodiment, the user may be provided with a library of object shapes from which they can select, each shape object capable of manipulation by a user following insertion into the video material.

In one embodiment, the video material may be viewed by downloading from the internet, the video material provided on a video player. In another embodiment, the video material may be downloaded from the internet to be played on a video player already provided on a viewers computer. The video player may be one conventionally known in the art, such as Flash™ or QuickTime™.

If more than one additional material (advertisement) is to be inserted into the video material, then the additional material may be provided as separate layers (files) or all the additional material (more than one advertisement) may be provided in one layer.

In one embodiment, the video material can be played in conventional video players such as Flash™ and QuickTime™.

During viewing of the video material (and the advertising component) viewing metrics can be provided by a video player to a metrics collection server system for analysis, in order to determine viewing milestones and statistics. This is particularly important if a revenue is required from the advertiser upon x numbers of viewings of the additional material.

Certain video files can be modified such that a player and client computer report metrics audit trail information back to a server. The viewing metrics may provide information such as IP address of viewer; video material ID; pointer to start and end of the appearance of the additional material; campaign ID; brand ID; check sum (verify IP and data); frames per second, and can provide markers as to where in the video material the viewer got to, for example, if they watch enough to view the additional material and/or whether they watch part or all of the additional material.

The video material player transmits the viewing metrics data back to the server, for example, by sending a "fetch" request to the server as known in the art, however, the fetch request comprises metrics data. Further, metrics data may be stored, for example, within the video file or in association with it, and this is referred to herein as "metrics metadata". The metrics metadata may include information such as pre-roll start and pre-roll end; video material start; additional material (embed) start; additional material (embed) end; video material end, post-roll start; and post-roll end. Further, it may include graphic overlay information for clickable hyperlinks.

In another embodiment, a link may be provided within the video material (such as a graphical button) which may appear in one of the corners of the screen of the video material when the additional material is being viewed, such that if a user activates the button by clicking it or pressing an interactive button on a remote controller, they are provided with further information regarding the additional material. In one embodiment, they are linked to the website of the additional material campaign.

Figure 11:
FIG. 11 illustrates a frame of video material comprising additional material.
Figure 12:
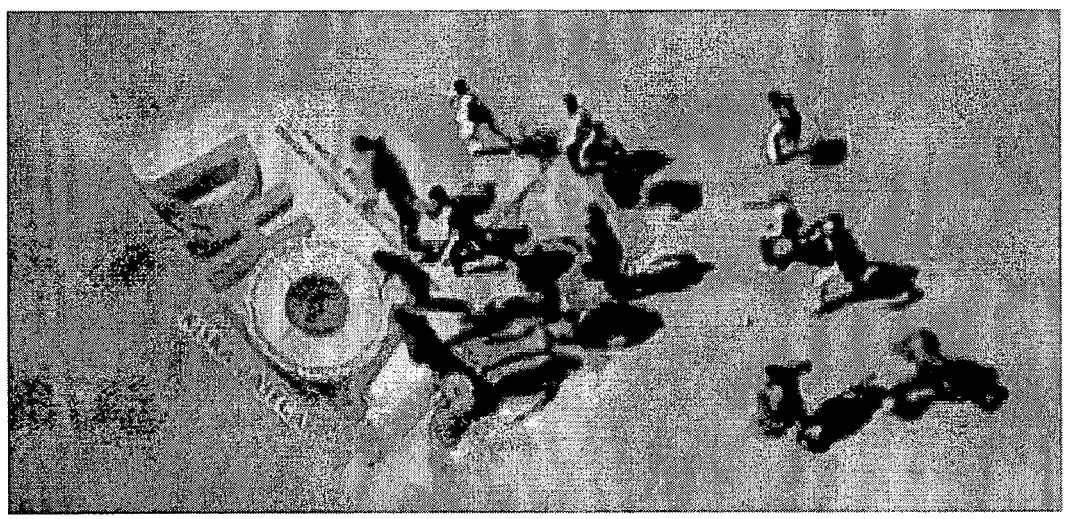
FIG. 12 illustrates a frame of video material comprising additional material.

FIGS. 11 to 20C illustrates embodiments of the present invention. As illustrated in FIG. 11, additional material (the Clearasil™ advertisement) has been inserted into the video material. In this embodiment, the additional material has been inserted into the background onto a rigid component (i.e. the picture frame). In FIG. 12, additional material (the DFIOL™ advertisement) has been inserted into the video material. As can be seen in FIG. 12, the additional material is embedded into the background, such that shadows of people appear over the additional material.

Figure 13A:
FIGS. 13A and 13B illustrates a frame of video material comprising additional material.
Figure 13B:
Figure 14A:
FIGS. 14A and 14B illustrates a frame of video material comprising additional material.
Figure 14B:

In FIGS. 13A and 13B the Coca Cola™ bottle has been inserted into the foreground of the video material, such that the person's hand moves behind the bottle (FIG. 13B) and can been seen through the Coca Cola™ bottle. In FIGS. 14A and 14B, the Sprite™ banner has been inserted into the background onto a rigid component (i.e. the wall). As can be seen in FIG. 14B, the ball which is thrown travels in front of the additional material. The Z-ordering module 1400 has determined that the ball is closer to the camera than the wall, and that the ball passes in front of the wall, and thus the ball is required to pass in front of the additional material, once the additional material has been inserted.

Figure 15A:
FIGS. 15A and 15B illustrates a frame of video material comprising additional material.
Figure 15B:

This Z-ordering is also illustrated in FIGS. 15A and 15B. In FIG. 15A the Coca Cola™ banner has been inserted into the background onto a rigid component (i.e. the wall). The Z-ordering module 1400 has determined that the woman is closer to the camera than the wall, and that the woman passes in front of the wall, and thus the woman is required to pass in front of the additional material (the Coca Cola™ banner), once the additional material has been inserted as illustrated in FIG. 15B.

Figure 16:
FIG. 16 illustrates a frame of video material comprising additional material.

In FIG. 16 the Heinz™ tomato ketchup bottle is the additional material. The Z-ordering module 1400 has determined that the woman is closer to the camera than the table on which the tomato ketchup bottle is to be provided, and that the table is closer to the camera than the grass and plants.

Figure 17:
FIG. 17 illustrates a frame of video material comprising additional material.
Figure 18A:
FIGS. 18A and 18B illustrates a frame of video material comprising additional material.
Figure 18B:
Figure 19A:
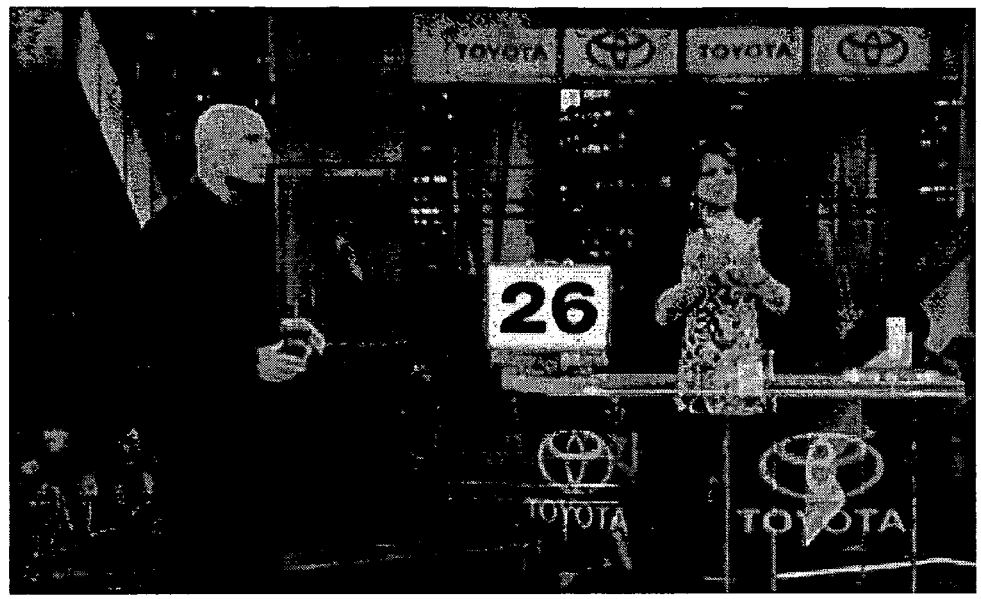
FIGS. 19A and 19B illustrates a frame of video material comprising additional material.
Figure 19B:

In FIG. 17 the Budweiser™ logo provided on the T-shirt is the additional material. In this instance the Budweiser™ logo is provided on a non-rigid component (i.e. the T-shirt) which is in the foreground FIG. 18A and FIG. 18B illustrate the insertion of a car into the video material. FIGS. 19A and 19B illustrate that different additional material can be provided with the same video material. In FIG. 19A the Toyota™ logo is displayed on the counter and in FIG. 19B the Adidas™ logo is displayed on the counter. As can be seen from FIGS. 19A and 19B the logo has the same properties as the counter (i.e. the logo is semi-transparent, such that the woman can be seen through the counter and the logo). This arrangement enables different advertisements to be used when the video material is viewed in different countries or regions.

Figure 20A:
FIGS. 20A to 20C illustrates a frame of video material comprising additional material.
Figure 20B:
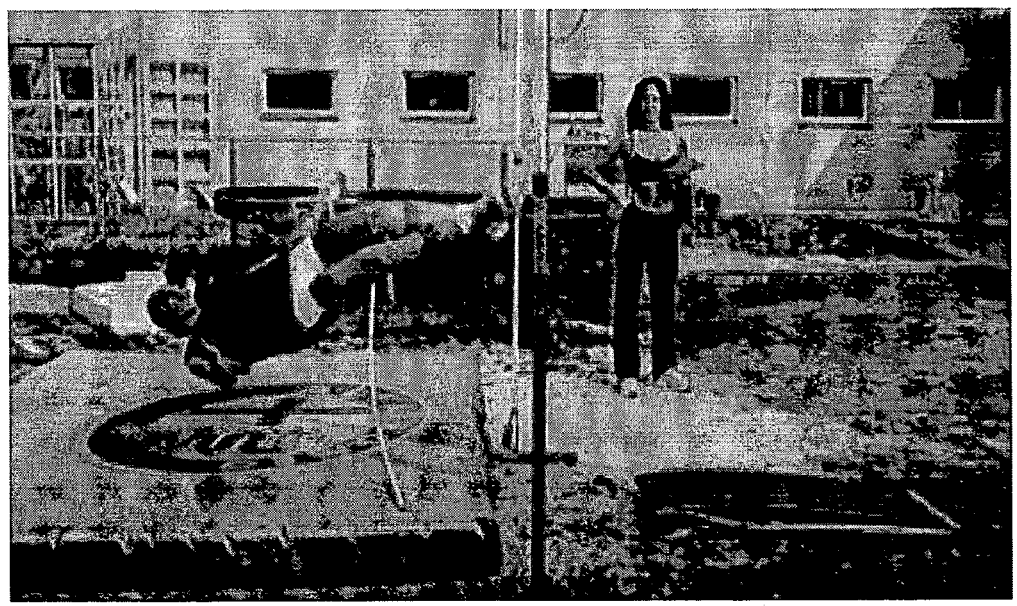
Figure 20C:
Figure 20D:
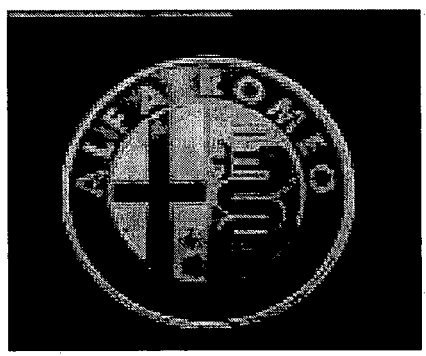
FIG. 20D illustrates additional material.

Finally, FIGS. 20A, 20B and 20C illustrate a sequence of frames of a video material. In FIGS. 20A, 20B and 20C the ALFA ROMEO™ logo illustrated in FIG. 20D is provided on the surface of the crash mat. The shadow and pole are provided across the logo as the person falls onto the crash mat, as illustrated in FIG. 20B, and then the logo deforms with the crash mat in FIG. 20C when the person lands on the crash mat.

Figure 7:
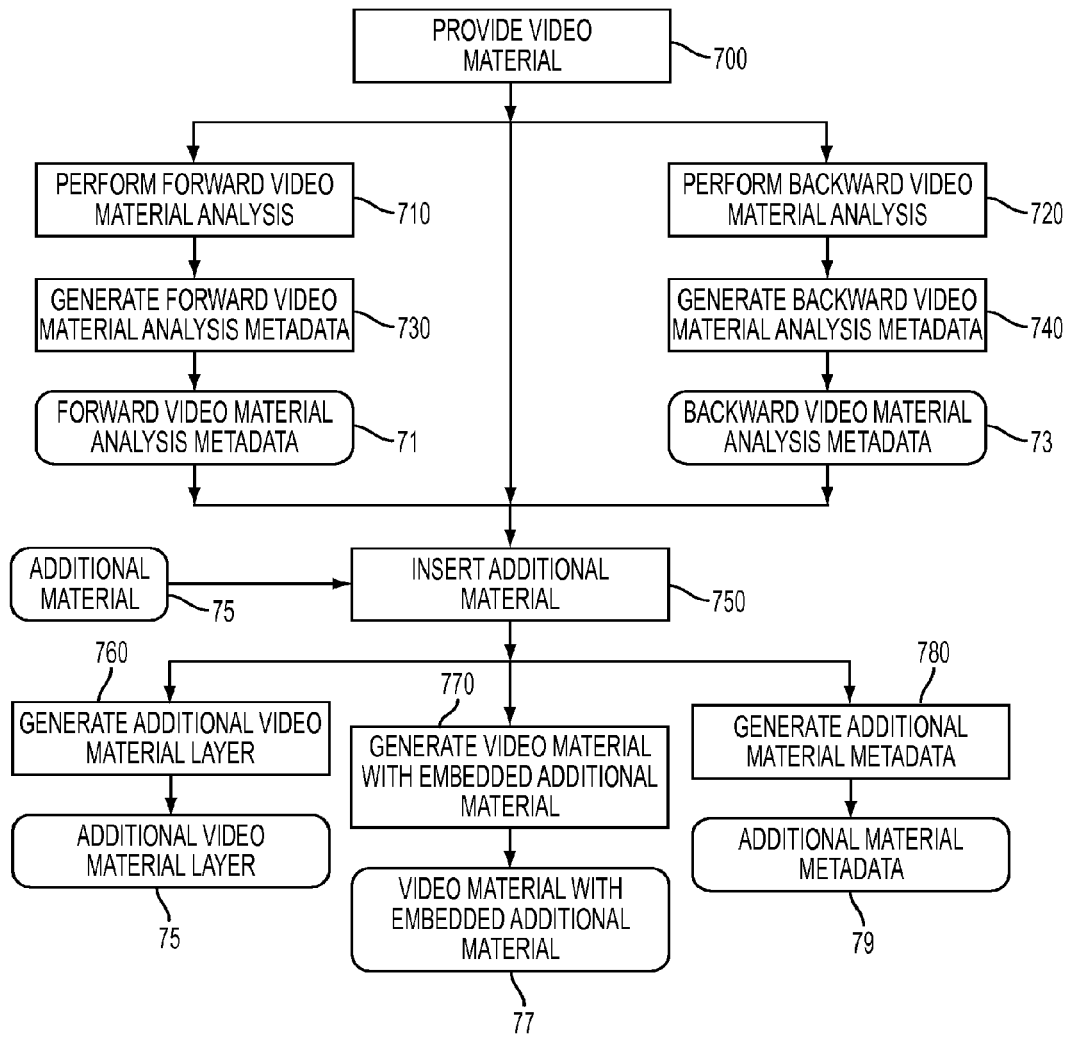
FIG. 7 illustrates a process for inserting additional material into video material.

FIG. 7 illustrates a user assisted method for inserting additional material (for example advertisements) into video material.

Following provision of the video material at step 700, the video material is analyzed in order to insert additional material into the video material. The analysis process involves performing forward video material analysis (step 710), and performing backward video material analysis (step 720). As stated above, the forward and backward analysis can be performed either by one processor one after the other, or by two processors simultaneously.

As a result of the forward analysis of the video material forward video material analysis metadata 71 is generated (step 730) and as a result of the backward analysis of the video material backward video material analysis metadata 73 is generated (step 740).

It is advantageous to perform forward and backward video analysis since it improves the accuracy of the system. It is easier to identify temporal video discontinuations in color (even if very slight) when performing forward and backward analysis. The analysis may be performed post-insertion for placement analysis, but may also be performed pre-insertion for scene analysis.

Following the forward and backward analysis of the video material, the additional material 75 is inserted into the analyzed video material (step 750). The apparatus can then generate an additional video material layer 75 at step 760 (this layer may be an overlayer for simultaneous video as discussed above). Alternatively, or in addition, the apparatus may generate the video material with the additional material inserted into the insertion zone(s) 77 at step 770 as a single video file. As a further alternative or in addition, the apparatus can generate additional material metadata 79 at step 780, which identifies the additional material and defines the placement and behavior of the additional material in the video material, and supplies the additional material metadata 79 in association with or as part of the original video file. The additional material metadata 79 may include metrics data, as described above, such as the size of the additional material etc. The additional material may be provided separately, either ahead of transmission to the player, or at the player so that it can be combined and played out.

Figure 6:
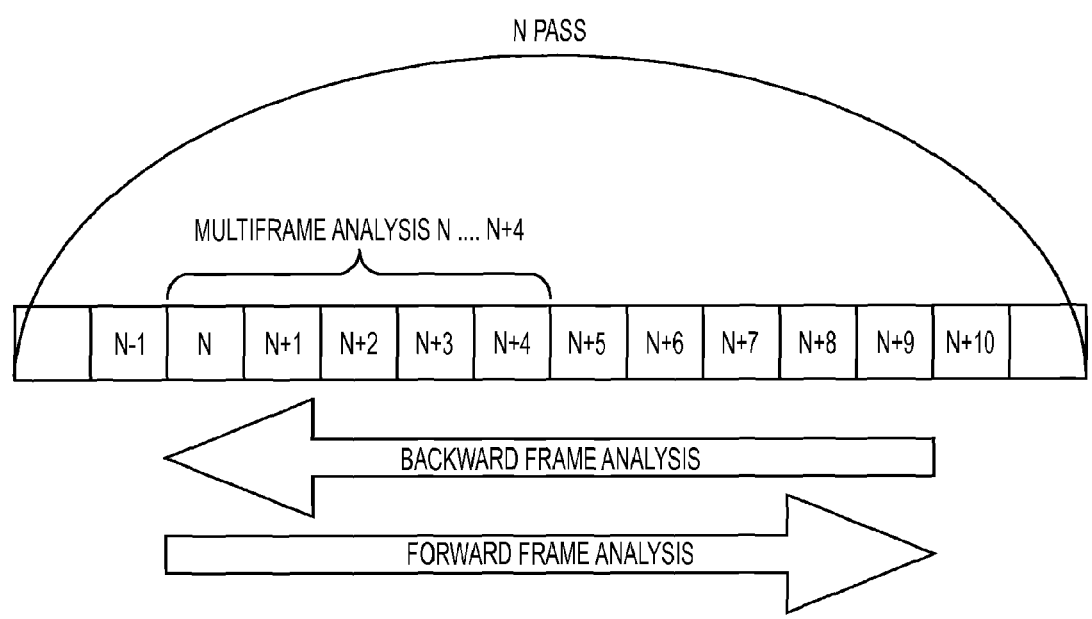
FIG. 6 illustrates multi-frame analysis of the present invention.

Forward and backward analysis can also be described with reference to FIG. 6 which illustrates several frames of video material, frames N=−1 to frame N=10. Backward frame analysis involves analyzing each frame of the video material sequentially in reverse order, for example, starting at N=5, the next frames to be analyzed is N=4, followed by N=3, followed by N=2 etc. Forward frame analysis involves analyzing each frame of the video material sequentially, for example, starting at N=5, the next frames to be analyzed is N=6, followed by N=7, followed by N=8 etc. This analysis enables greater accuracy when tracking an identified zone throughout the video material.

In another embodiment, it is possible to perform forward and backward analysis by processing every mth frame, m (the skip length) being an integer, e.g., m may equal 1, 2, 3, 4, 5, 6, 7, etc. For example, if m=3, then backward frame analysis involves analyzing each third frame of the video material sequentially in reverse order, for example, starting at N=5, the next frame to be analyzed is N=2, followed by N=−1, etc. Forward frame analysis involves analyzing each third frame of the video material sequentially, for example, starting at N=3, the next frame to be analyzed is N=6, followed by N=9, etc.

It is advantageous to perform forward/backward frame analysis every mth frame in order to increase processing speed. The process may skip forward/backwards though the video material every m frames. If an insertion zone is identified in a frame for the first time, the process then works backwards/forwards to find the frame where the insertion zone begins.

For example, again referring to FIG. 6, if m=4, for backward frame analysis, starting at N=8, the next frame to be analyzed is N=4, followed by N=N, followed by N=−4 (not illustrated) etc. If an insertion zone is identified at N=N, then the process returns to N=3 (since it is known that the insertion zone does not appear in frame N=4) and then skips backwards through N=3, N=2, N=1 etc. until the insertion zone is identified in a frame. Alternatively, If an insertion zone is identified at N=N, the process can skip forwards through N=1, N=2, N=3 etc. until the insertion zone is identified in a frame. For forward frame analyzes, if m=4, starting at N=−1, the next frame to be analyzed is N=3, followed by N=7, followed by N=11 (not illustrated) etc. If an insertion zone is identified at N=7, then the Process returns to N=4 (since it is known that the insertion zone does not appear in frame N=3) and then skips forwards through N=4, N=5, N=6 etc. until the insertion zone is identified in a frame. Alternatively, If an insertion zone is identified at N=7, the process can skip backwards through N=6, N=5, N=4 etc. until the insertion zone is identified in a frame.

The forward and backward analyzes a can be performed simultaneously (as illustrated in FIG. 7) or serially.

This process can also be used, when a template (as discussed above) is to be identified within the video material as opposed to an insertion zone. In that instance, the skip length (m) can be set as the minimum duration the template is to appear in the video material.

The process results in video material provided with at least one additional material. Above we have described the additional material as being inserted into the video material. Although this appears to be the final result when the processed video material is viewed, this is not necessarily the case.

For example, in one embodiment, the additional material is inserted into the video material such that it is embedded into the video material. In this embodiment, the resulting file is one file, which when played comprises the amended video material to include the embedded additional material (step 770 of FIG. 7).

In another embodiment, the additional material can be provided in a separate file, such that the two files (the video material as originally provided and the additional material), are played simultaneously, and the additional material is provided in a further video layer which overlays the original material for example a smaller layer that overlays the original material that contains parts of the original video combined with the additional material (step 760 of FIG. 7). This arrangement is advantageous in that the original video material file is not altered, and the additional material can be altered and/or substituted easily.

In another embodiment, the video material is provided with zone metadata which defines where the additional material is to be provided and how it is to be inserted, and the additional material is provided separately (step 780 of FIG. 7).

In another embodiment, the additional material to be embedded can be provided as two or more components, for example as (i) a template object (2-D or 3-D) and (ii) as a surface for the template object.

All three embodiments, when played result in the appearance of seamless insertion of additional material into video material.

Optionally, the system according to embodiments of the present invention may be comprised of one or more scalable processing computer systems. One known example of a scalable computer system is the "Amazon Elastic Compute Cloud (EC2)". Such scalable computer systems allow scalable deployment of various applications, that is to say the computer system is controlled such that user demand causes creation, launch and termination of computer system capacity on demand. This can be controlled either automatically by a controller or manually by a system administrator. In this way, the overall processing power of the system can be increased or decreased according to requirements. By way of example, a system comprising six computer systems may operate using only one of the six computer systems during instances of low demand, however, the system may be configured (or 'scaled') to initiate as many of the remaining five computer systems as necessary in order to cope with an increase in required processing power during instances of high demand. Such systems are advantageous in that the runtime of superfluous computer systems is kept to a minimum, yet the system is able to cope with high demand during times of high data traffic.

The video material may have been created using any one of a plurality of different software programs and may be suitable for display on any one of a plurality of different electronic devices, such as personal computers, digital television set-top boxes, mobile telephones, personal digital assistances (PDA's), gaming systems and/or MP3 players. Consequently, the processor 1000 is capable of processing video material of any one of a plurality of different formats.

The video material may be distributed to a plurality of electronic devices of the same or different types, following insertion of additional material, such that the video material may be distributed in a plurality of different formats, each format suitable for viewing on a different type of electronic device.

The video material may be, for example a user-generated video clip, a film, a television program, a sports event, a music event of any duration, or a static image, such as a photograph.

In one embodiment, the video material is retrieved from a remote location for processing.

In one embodiment of the invention the additional material may be either a static advertising components or may be an animated advertising component.

FIG. 9A illustrates a non-intrusive advertising component. The advertising component has been inserted into a wall within the video material. An animated advertising component moves within the video material.

The process and apparatus of the invention is capable of use with multi-format video material. Video material recorded using any one of a plurality of different software is capable of use with the system and apparatus of the invention. The video material is transcoded when retrieved from its original location into a format which is capable of use with the system and method of the invention, as described herein before. Then, when the video material is returned to its original location, the video material is transcoded into the appropriate original format having the same tag and address as the video material had prior to it being retrieved from its original location.

The process of the present invention enables advertising components to be inserted into video material, following recording of the video material. In this way advertising revenue can be generated from pre-recorded video material without deteriorating the consumer's viewing pleasure by inserting spliced advertising components. Furthermore, the process of the present invention enables advertising components to be inserted into, for example, back catalogs of films or television programs.

Those skilled in the art will appreciate that while the foregoing has described what is considered to be the best mode and, where appropriate, other modes of performing the invention, the invention should not be limited to the specific configurations and methods disclosed in this description of the preferred embodiment. Those skilled in the art will recognize that the invention has a broad range of applications in many different types of advertising, and that the embodiments may take a wide range of modifications without departing from the inventive concept as defined in the appended claims.

What is claimed is:

1. An apparatus for inserting additional material into pre-recorded video material, the apparatus configured to:
   determine one or more candidate insertion zones within the pre-recorded video material, the candidate insertion zones identifying portions of frames of the pre-recorded video material into which additional material may be inserted;

identify a first scene of the pre-recorded video material in which a selected insertion zone appears, the selected insertion zone being one of the one or more candidate insertion zones;

identify a second scene in which the selected insertion zone appears, wherein the first scene and the second scene are separated by a third scene in the pre-recorded video material in which the selected insertion zone does not appear;

receive additional material for insertion into the selected insertion zone in the pre-recorded video material;

generate insertion zone metadata for the selected insertion zone, the insertion zone metadata comprising:
 attributes of the selected insertion zone;
 timing data defining when the additional material is to be inserted into the selected insertion zone; and
 manipulation instructions for manipulating the additional material; and generate output video material, in response to processing the insertion zone metadata, the output video material including the pre-recorded video material and the additional material inserted into the selected insertion zone in at least the first scene and the second scene of the pre-recorded video.

2. The apparatus of claim 1, wherein the timing data includes a start point and a stop point defining when the additional material is to be inserted into the selected insertion zone.

3. The apparatus of claim 1, wherein manipulation instructions comprise instructions for embedding the additional material into the pre-recorded video material, and wherein the generated output video material comprises the additional material embedded into at least the first scene and the second scene of the pre-recorded video material.

4. The apparatus of claim 1, wherein the generated output material comprises:
 the pre-recorded video material on a first video layer; and
 the additional video material on a second video layer, wherein the second video layer is overlayed on the first video layer.

5. The apparatus of claim 1, wherein the additional video material comprises one or more of:
 one or more 2D video objects;
 one or more 3D video objects; and
 one or more surface textures.

6. The apparatus of claim 5, wherein the one or more surface textures comprises shadows, highlights or other lighting effects.

7. The apparatus of claim 1, wherein the apparatus is configured to:
 detect the presence of black bars around each frame of video material based on a variation of pixel content in the pre-recorded video material; and
 remove detected black bars from the pre-recorded video material.

8. The apparatus of claim 1, wherein the apparatus is configured to:
 determine a video format of the pre-recorded video material based on interlacing of the pre-recorded video material.

9. The apparatus of claim 1, wherein the apparatus is configured to:
 identify occlusion zones which correspond to objects which obscure some or all of the one or more candidate insertion zones;
 generate masks for the identified occlusion zones;
 generate an occlusion video layer comprising the generated masks; and
 overlay the pre-recorded video material with the occlusion video layer, wherein the transparency of the generated masks of the occlusion video layer can be manipulated.

10. The apparatus of claim 1, wherein the apparatus is configured to detect a scene change within the pre-recorded video by determining a breakdown in visual similarity between a group of consecutive frames of the pre-recorded video material, and wherein a scene change is determined where two sequential frames are no longer similar.

11. The apparatus of claim 1, wherein the apparatus is configured to detect a scene change within the pre-recorded video material by detecting and tracking a plurality of feature points in each frame of the pre-recorded video material, and wherein a scene change is determined between a first frame and a second frame where a large proportion of feature points in the first frame do not appear in the second frame.

12. The apparatus of claim 1, wherein the attributes of the selected insertion zone include one or more of tracking information, camera calibration information, lighting, color balance, occlusions and opacity, shadows, highlights, masking, which pixels belong to which object together with determined confidence levels, image grain, and motion blur.

13. The apparatus of claim 1, wherein the apparatus is configured to determine insertion zone metrics, for the one or more candidate insertion zones, including one or more of a size of the one or more candidate insertion zone, a duration of the one or more candidate insertion zones, and a monetary value of the one or more candidate insertion zones.

14. A method of inserting additional material into pre-recorded video material, the method comprising:
 determining one or more candidate insertion zones within the pre-recorded video material, the candidate insertion zones identifying portions of frames of the pre-recorded video material into which additional material may be inserted;
 identifying a first scene of the pre-recorded video material in which a selected insertion zone appears, the selected insertion zone being one of the one or more candidate insertion zones;
 identifying a second scene in which the selected insertion zone appears, wherein the first scene and the second scene are separated by a third scene in the pre-recorded video material in which the selected insertion zone does not appear;
 receiving additional material for insertion into the selected insertion zone in the pre-recorded video material;
 generating insertion zone metadata for the selected insertion zone, the insertion zone metadata comprising:
  attributes of the selected insertion zone;
  timing data defining when the additional material is to be inserted into the selected insertion zone; and
  manipulation instructions for manipulating the additional material; and
 generating output video material, in response to processing the insertion zone metadata, the output video material including the pre-recorded video material and the additional material inserted into the selected insertion zone in at least the first scene and the second scene of the pre-recorded video.

15. The method of claim 14, wherein the timing data includes a start point and a stop point defining when the additional material is to be inserted into the selected insertion zone.

16. The method of claim 14, wherein manipulation instructions comprise instructions for embedding the additional material into the pre-recorded video material, and wherein the generated output video material comprises the additional material embedded into at least the first scene and the second scene of the pre-recorded video material.

17. The method of claim 14, wherein the generated output material comprises:
the pre-recorded video material on a first video layer; and
the additional video material on a second video layer, wherein the second video layer is overlayed on the first video layer.

18. The method of claim 14, wherein the additional video material comprises one or more of:
one or more 2D video objects;
one or more 3D video objects; and
one or more surface textures.

19. The method of claim 14, comprising:
identifying occlusion zones which correspond to objects which obscure some or all of the one or more candidate insertion zones;
generating masks for the identified occlusion zones;
generating an occlusion video layer comprising the generated masks; and
overlaying the pre-recorded video material with the occlusion video layer, wherein the transparency of the generated masks of the occlusion video layer can be manipulated.

20. A non-transitory computer-readable storage medium comprising computer-executable instructions which, when executed by a processor, cause a computing device to perform a method of inserting additional material into pre-recorded video material, the method comprising:
determining one or more candidate insertion zones within the pre-recorded video material, the candidate insertion zones identifying portions of frames of the pre-recorded video material into which additional material may be inserted;
identifying a first scene of the pre-recorded video material in which a selected insertion zone appears, the selected insertion zone being one of the one or more candidate insertion zones;
identifying a second scene in which the selected insertion zone appears, wherein the first scene and the second scene are separated by a third scene in the pre-recorded video material in which the selected insertion zone does not appear;
receiving additional material for insertion into the selected insertion zone in the pre-recorded video material;
generating insertion zone metadata for the selected insertion zone, the insertion zone metadata comprising:
attributes of the selected insertion zone;
timing data defining when the additional material is to be inserted into the selected insertion zone; and
manipulation instructions for manipulating the additional material; and
generating output video material, in response to processing the insertion zone metadata, the output video material including the pre-recorded video material and the additional material inserted into the selected insertion zone in at least the first scene and the second scene of the pre-recorded video.

* * * * *